J. F. WHITE.
MACHINE FOR HEATING COATED FABRIC.
APPLICATION FILED APR. 17, 1916.
1,266,735.
Patented May 21, 1918.
3 SHEETS—SHEET 3.
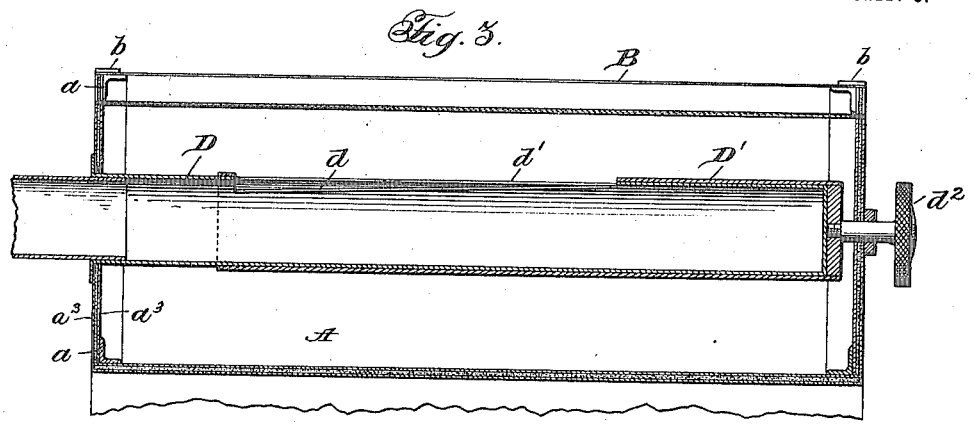
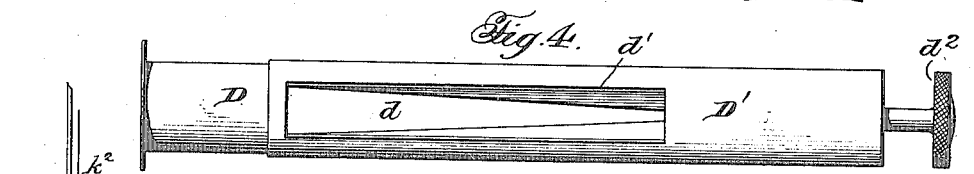
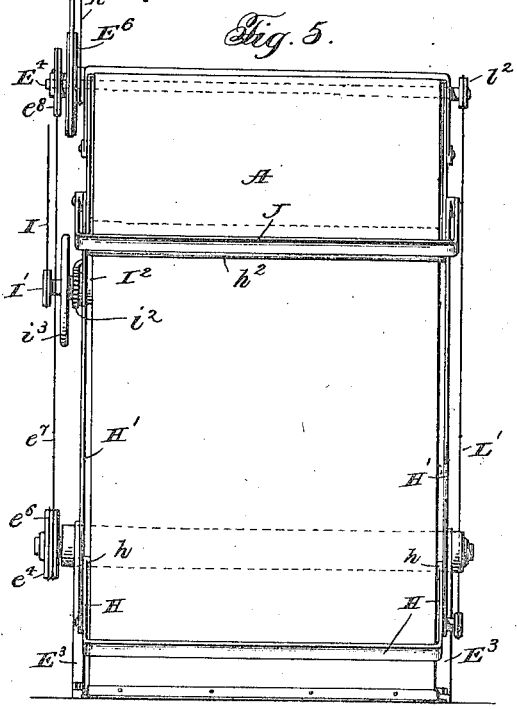
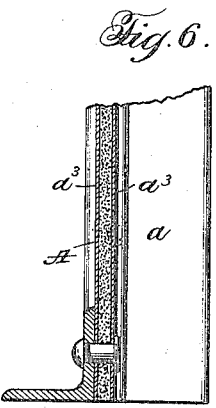
Witness:
Jas. E. Hutchinson
Inventor:
John F. White,
By Bram Milans Attorneys

UNITED STATES PATENT OFFICE.

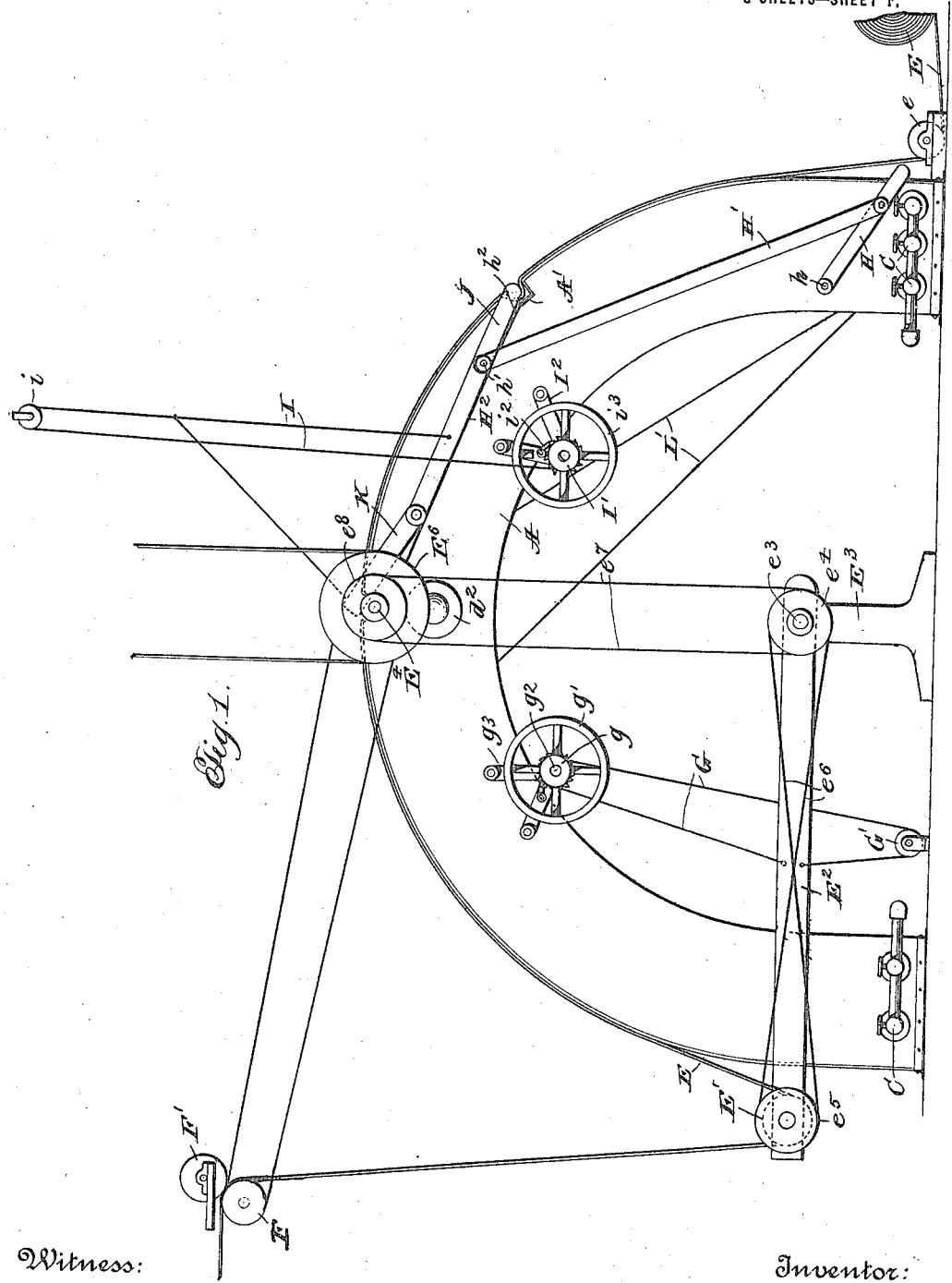

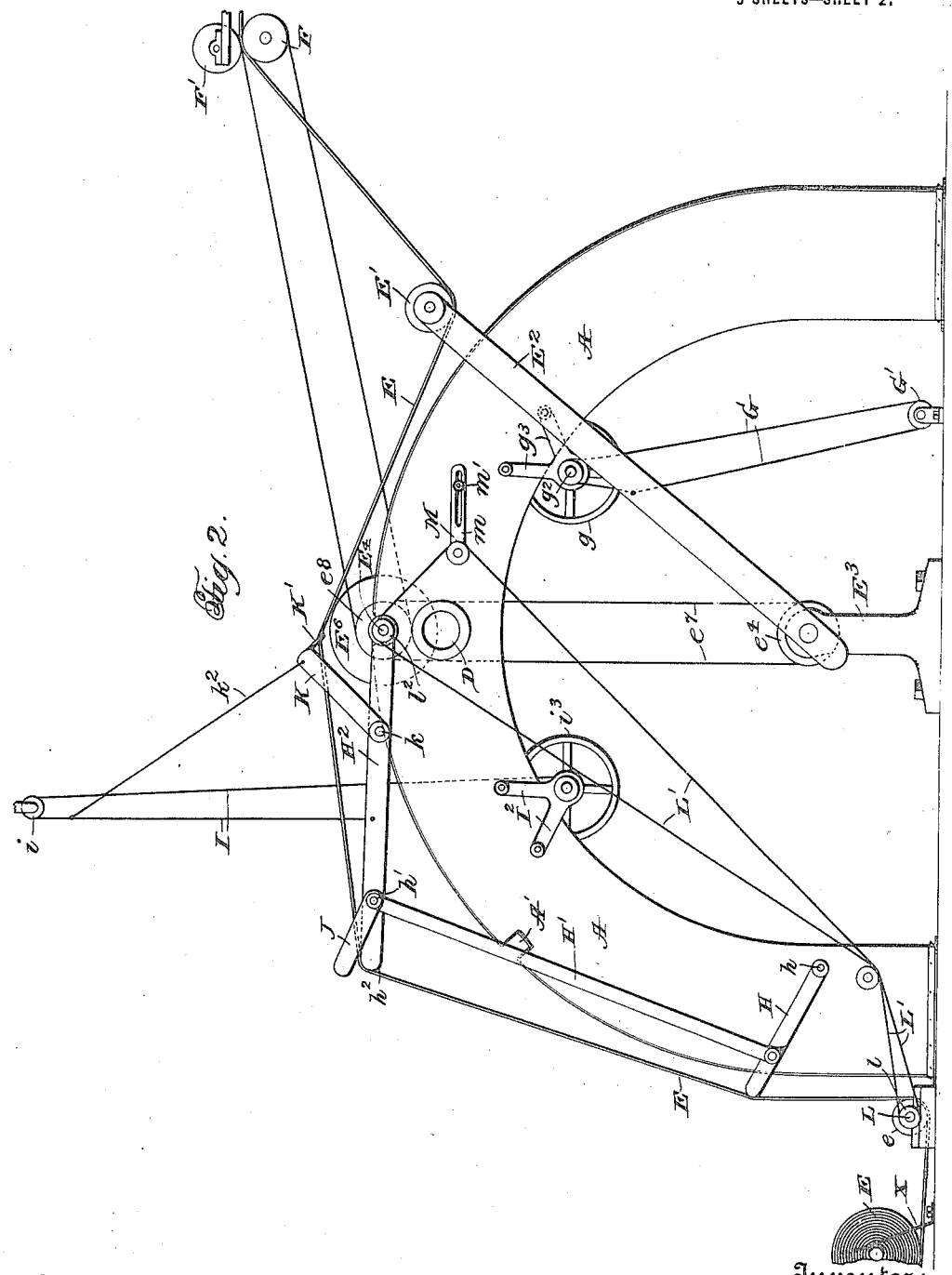

JOHN F. WHITE, OF CHICAGO, ILLINOIS.

MACHINE FOR HEATING COATED FABRIC.

1,266,735.

Specification of Letters Patent.

Patented May 21, 1918.

Application filed April 17, 1916. Serial No. 91,677.

*To all whom it may concern:*

Be it known that I, JOHN F. WHITE, a citizen of the United States, residing at Chicago, in the county of Cook and State of Illinois, have invented certain new and useful Improvements in Machines for Heating Coated Fabric, of which the following is a specification, reference being had therein to the accompanying drawing.

This invention relates to an improved machine for heating coated fabric. In my application for United States Letters Patent Serial No. 831,919, I have shown and described an apparatus for coating fabric with a solution of water-repellent material consisting primarily of an asphaltum base, petroleum-residuum and when desired a percentage of paraffin wax. The coating is applied to one face of the fabric and a portion or the greater part of the coating material is then removed, for the purpose of making a water-repellent fabric, for use in the arts, especially of glove making, personal wear making, i. e., overalls, outside coats, etc. In connection therewith I have ascertained that it is expedient and necessary to heat the treated surface of the fabric to a high degree of heat by passing the same rapidly over an ironing or heating surface.

The present invention relates to a heater for use in connection with such treated material. An object of the invention is the provision of a heater which can be economically operated; which will present a large superficial area over which the material may be passed, to provide instrumentalities which will properly remove the material from the heated surface should there be a pause in the machinery or the movement of the material, and to associate with the heater, suitable instrumentalities whereby proper tension may be placed on the goods, a rapid movement of the goods over the heated surface attained and a variable contact acquired to accord with the required conditions.

While in the accompanying drawings there is shown a form of heater designed for the purposes above indicated, it is to be expressly understood that the invention is not limited to its mechanical features, as various modifications and changes can be made without in the least departing from the general principle of the invention.

In the drawings:

Figure 1 represents a side elevation of a heater with its associated parts;

Fig. 2 is a side elevation of the machine looking from the opposite side of Fig. 1 and showing the raising mechanism elevated;

Fig. 3 is a sectional view taken through the drum and illustrating the exit flue in section;

Fig. 4 is a detail view of the exit flue;

Fig. 5 is an end view of the heater; and

Fig. 6 is a sectional view showing the construction of the drum.

In the drawings the heater is represented at A and consists preferably of an arch-shaped structure, having side and bottom walls formed of non-heat conducting material, suitably supported and braced by angle bars $a$. These bars are located at each corner and are arched to form the truss frame for the structure. The top of the heater is formed of a thin metal plate B, reinforced at its edges by the encircling bands $b$ which constitute stiffening members as well as guides for the fabric passing over the metallic heating surface B. In the lower legs of the arched drum or heater, suitable gas jets C are placed, any convenient form of gas burner or jet being employed, as may be desired. Located at the crown of the arch is the exit flue D. This flue is passed through the side wall of the heater and extends into the heater to a point approximately the opposite side wall. It is formed in its upper face with a V-shaped exit opening $d$ having its largest diameter adjacent the point where the flue leaves the casing. Surrounding the flue within the heater, is a sleeve D' having a rectangular opening $d'$ therein, of a width substantially the width of the greatest diameter of the V opening in the flue.

The damper sleeve D' is provided with means $d^2$ extending to without the casing for turning the same on the flue member. By this means a proper distribution of the heated products of combustion is acquired in the heater near the exit flue as the gases flowing out gradually increase in volume toward the final exit flue. By locating the exit at the top the heated products will leave at a point adjacent the heating surface of the heater and thereby maintain a proper heated condition for the entire curved surface of the heater.

The structure thus far described is of substantial dimensions, rigid in its mounting and may be fixed to a suitable base in any convenient manner.

E represents the fabric to be treated. It is conveniently passed from its spindle or shaft upon which it is wound over a roller $e$ located adjacent the bottom of the heater. It is then carried in conformity with the arc of the heater over the metallic heated surface, downward toward the opposite sides where it is passed over a drum E' and from thence to what may be termed nipping rolls F, F', located conveniently on a plane above that of the top of the heater. The force for moving the fabric may be of any convenient winding means located at the rear or the nippers, may be depended on in which case the latter may be driven in a manner presently to be described. By this means the cloth is held tight onto the heating surface of the heater, substantially throughout its circumference and is moved rapidly thereover to prevent burning, and during its movement the treated material is caused to be absorbed, penetrating the fibers of the material and thus rendering the latter water-repellent, while maintaining its open-mesh ventilated characteristic.

It has been found expedient to positively drive the member E' and to so mount the same that it may be adjusted from its lowermost to an elevated position, this for the purpose of shortening the period of contact of the material with the heater surface.

A convenient means for accomplishing this result is that of supporting the rolls E' on a U-shaped frame $E^2$ mounted on a standard $E^3$, centrally located below the heater. The arms of the frame extend on opposite sides of one leg of the heater and the roll E' is mounted loosely in the outer ends of the arm. Owing to the concentric mounting of the arms, the roll can be moved concentrically up or down without varying its spaced position with relation to the heating surface. Mounting on the standard $E^3$ is a shaft $e^3$ carrying a driving pulley $e^4$. The end of the shaft carrying the pulley E' is also provided with a driving pulley $e^5$ and a cross belt $e^6$ is extended over the pulleys. The pulley $e^4$ is conveniently of the double groove type and over the same is passed a vertical belt $e^7$, the upper end of which passes over a pulley $E^8$. The latter is mounted on a main drive shaft $E^4$ supported in suitable brackets $E^5$ at the sides of the casing and carrying a sprocket driven wheel $E^6$.

Power is transmitted to the shaft $E^4$ through a belt connection, as shown, and through an applied pulley or other means a belt extends from the power shaft to the nipper rolls F' whereby the latter are positively driven. The shaft $E^4$ is located in a groove formed in the top of the casing slightly below the plane of the treating surface. The groove itself is of a width greater than the shaft for purposes presently to be described.

By the above arrangement it will be readily seen that the drum or wheel E' may be positively driven to accelerate the movement of the material over the heating surface and may be adjusted up or down, as conditions of the cloth may require.

A convenient means for effecting this vertical adjustment is shown in the drawing as representing an endless band G connected at one end to one arm $E^2$ of the U-frame passing over a winding drum $g$ operated by a hand wheel $g'$ on a shaft $g^2$ mounted in brackets $g^3$ on the casing. The opposite end of the endless band is conveniently passed over an idler G' mounted on the base or floor and is thence carried up and attached to the swinging frame. By this means a winding or unwinding of the drum G causes the swinging frame to be moved upward or downward to its proper adjusted position and is retained in such position against upward movement, thus placing the necessary stretch or tension on the cloth.

It has been ascertained that a very high degree of heat can be employed, approximately 500° F., or over, in connection with the heated surface, and owing to this high temperature treatment it is necessary to move the material rapidly over the surface. It has been found, however, that if the material is allowed to rest on the surface for a short interval of time, combustion will soon take place. It often happens that upon the stopping of the machinery and also in the placement of the material on the heater while in the heated state such objectionable results will occur.

With a view of rendering it possible to remove the entire length of material which may be in a static condition on the heated surface and so promptly, the following instrumentalities are employed.

Mounted on a suitable pivot $h$ near the lower end of one of the legs of the furnace, conveniently opposite to that of the tension roll E', is a swinging yoke H, the outer end of which is normally positioned directly back of the incoming strip of cloth, as shown in Fig. 1. The length of the side arms of the yoke H is materially greater than the diameter of the heater A and normally stands obliquely with its protruding ends downward, the outer connecting bar being obviously greater than the width of the heater. This connecting bar may be properly rounded and serves to engage the fabric and lift it from the heater in a manner shown in Fig. 4, when the bar is elevated. The outer end of the yoke H is connected on opposite sides by links H', extending upwardly and having their upper ends pivotally connected at $h'$ to an operating lever H² consisting conveniently of a U-shaped frame, an arm of which is located on opposite sides of the heater. The inner ends of the operating lever are conveniently mounted on the shaft E⁴. A convenient means for elevating the lever H² is that of a cord and windlass, represented by the cord or flexible member I connected to the lever H² intermediate its end passing over the pulley $i$ thence downward to the hand operated drum I', having a suitable ratchet and pawl holding mechanism $i^2$ and an operating hand wheel $i^3$.

The shaft of the drum I' and wheel structure is mounted conveniently in the bracket I² on the casing. It is necessary to remove the fabric from all points of the heater and therefore an intermediate mechanism is employed consisting conveniently of the extended end of the lever structure H² and its cross-over member $h^2$. This cross-over member or end bar of the operating lever normally rests in a depression A' of the casing and emerges therefrom upon the upward movement of the lever carrying the fabric with it. To properly guide the fabric should it move while in its suspended position, a suitable swinging U-shaped guiding bar J is employed mounted on the lever H² and below which the fabric is placed. This bar also serves as a means for smoothing out the fabric and for removing any adhering substances that may be on the outer surface thereof.

A similar yoke-shaped lifting member K is employed at the top of the heater, the same being pivotally supported by its opposite arms and through the pivots $k$ to the inner ends of the lever arms H². The outer end of the yoke member K has a depending U-shaped supporting loop K' which is designed to enter the cavity or groove at the top of the casing to one side of the shaft E⁴. The material is threaded through the loop K'. To simultaneously raise the loop K' a cord or flexible member $k^2$ is employed, the same being connected conveniently to the elevating portion of the operating cord I so that upon the operation of the hand wheel $i^3$ the outer end of the yoke H, the outer end of the lever member H² and the loop K' are simultaneously elevated or moved outward from the heating surface, carrying therewith the cloth or fabric, as shown in Fig. 4. The operator immediately thereafter elevates the frame E² to the position shown in Fig. 4 and the stretched material on that side of the machine immediately leaves the treating surface.

In certain cases it may be necessary for tensioning purposes to place a reverse action or movement on the tension roll $e$ at the front of the machine, and this is accomplished by providing the shaft L thereof with a pulley wheel $l$ over which a suitable belt $i'$ passes to a pulley $l^2$ mounted on the drive shaft E⁴. Tension may be placed on this belt, as conditions may require, either to slow the movement of the idler or to increase its movement, by an adjustable tightener M mounted on the side of the casing in a bracket $m$ through a suitable binding nut $m'$ or other convenient mechanism.

In forming the sides of the casing A of non-conducting material it has been ascertained that a suitable asbestos filling may be employed interposed between spaced side plates $a^3$. It is owing to the rigidity of the structure thus formed that the various bracket members have a secure anchorage to the casing.

The apparatus thus far described has in many particulars been tested and has been found to overcome many objections existing in the calendering roll type of machine and is a machine which presents a large superficial area for heating surfaces and one which can be economically operated without danger of firing and with a minimum number of operative parts.

While gas jets have been found to be advantageous, manifestly other heating means may be employed.

In operation it may be found necessary to apply hold-back or brake mechanism, as shown diagrammatically at X, associated with the supply roll, but in practice it has been found that the tensioning roll at the forward end of the machine with the stretching action of the associated parts, the cloth or fabric is held well stretched onto as it moves rapidly over the surface, and when it leaves the surface is properly treated and ready for market.

In operation the material is passed up the forward side over the crown and down the farther side of the heating drum or heater, being properly looped through the removing loops, the power is applied to the driving shaft E⁴ driving both pulleys C and E⁷ with a view of adding tautness to the cloth while the material is carried from the machine through the nipping rolls.

The lifting of the material from the heated surface has been heretofore explained. It, however, as heretofore stated, is evident that many changes can be made without departing from the invention.

Having thus described the invention, what is claimed as new and desired to be secured by Letters Patent is:

1. In a fabric heating machine, the combination with a substantially U-shaped drum member, of heaters at opposite ends thereof, an exit port comprising a tubular member entering the drum, and means for permitting a larger volume of exhaust from one side of the drum than from the other.

2. In a fabric heating machine, the combination with a drum member, of a heater therefor, an exhaust leading from the drum, and a regulated inlet extension for the exhaust located within the drum and provided with means for permitting a greater volume of exhaust at a point of the drum than the other.

3. In a fabric heating machine, the combination with a drum having heating means, of an exhaust pipe member entering the drum and communicating with the exhaust and having a V-shaped longitudinally arranged exhaust aperture, and means for varying the area of the said exhaust aperture.

4. In a fabric heating machine, the combination with a substantially U-shaped drum, means for heating the same, and means for carrying the fabric over the drum, of a pivoted lifter member interposed between the fabric and the drum.

5. In a fabric heating machine, the combination with a substantially U-shaped drum, means for heating the same, and means for carrying the fabric over the drum, of a plurality of pivoted lifter members interposed between the fabric and the drum.

6. In a fabric heating machine, the combination with a substantially U-shaped drum, means for heating the same, and means for carrying the fabric over the drum, of a pivoted lifter member interposed between the fabric and the drum, and means for operating the lifter member.

7. In a fabric heating machine, the combination with a substantially U-shaped drum, means for heating the same, and means for carrying the fabric over the drum, of a plurality of pivoted lifter members interposed between the fabric and the drum, and means for operating the lifter members.

8. In a fabric heating machine, the combination with a substantially U-shaped drum having separate depressions therein, of lifting members located in the depressions, and means for operating the lifting members to elevate the fabric from the drum.

9. In a fabric heating machine, the combination with a substantially U-shaped drum member, of means for heating the same, and spaced means for elevating the fabric from the drum comprising a series of connected levers having lifter portions, and means for operating the levers simultaneously.

10. In a fabric heating machine, the combination with a heating drum having means for heating the same, of a tension roll at the forward end of the drum, a tension roll at the opposite end of the drum, and driving means for operating the tension rolls and means for varying the extent of contact between the fabric and the drum.

11. In a fabric heating machine, the combination with a heating drum, of a driven shaft associated with the drum, a tension roll at the forward end of the drum, means operated by the shaft for operating the tension roll, and means for varying the operation of the tension roll.

12. In a fabric heating machine, the combination with a substantially U-shaped drum over which the fabric passes, means for heating the drum, a standard centrally located with reference to the drum, a swinging member on the standard, a roll carried by the swinging member and extending across the outer face of the drum, means for elevating and lowering the roll, and means for driving the roll.

13. In a fabric heating machine, the combination with a substantially U-shaped heating drum, of means for passing a fabric thereover, a roll associated with the drum, and below which the fabric is passed, and means for positively raising and lowering the said roll with relation to the drum.

14. A heating drum for treating fabric comprising a hollow U-shaped structure having insulated side and bottom parts, a relatively thin metal treating part, and means for heating the drum.

15. A heating drum for fabric comprising angle bars spaced apart, insulating side and bottom portions united to the angle bars, a thin plate top portion, and means for heating the drum.

16. In a heater for fabric, the combination with a framework, of insulated side and bottom portions connected with the framework, a heat transferring plate connected with the top of the framework and constituting the outer upper surface of the drum, and guides at the edges of the plate.

17. In a fabric heating machine, the combination with a heating member, of a heater therefor, of an exhaust device leading from said member, and means for varying the area of said exhaust device to control the exhaust from said member.

18. In a fabric heating machine, the combination with a heating member having means for heating the interior thereof, of means for drawing a fabric over said heating member, and adjustable means for varying the extent of contact between the fabric and the heating member, said adjustable means comprising a swinging frame pivotally mounted adjacent said heating member and movable over the same.

19. In a fabric heating machine, the combination with a drum member, and means for heating the same, of means for varying the extent of contact between the fabric and drum member, and means for lifting the fabric from the drum member, said last mentioned means including a plurality of pivotally associated links having portions over which said fabric passes.

20. In a fabric heating machine, the combination with a drum member having means for heating the same, means for drawing the fabric over the drum member, means for varying the extent of contact between the fabric and the drum member comprising a pivoted adjustable frame having a part thereof disposed upon the surface of the drum and over which the fabric passes, and means for lifting the fabric from the drum.

21. In a fabric heating machine, the combination with a heating member, of heaters disposed at different points in said member, an exit port leading from the member, and means for regulating the exhaust passing from said member comprising apertured telescopic devices, substantially as described.

22. In a machine of the character described, the combination with a heating member of means for heating the same, means for carrying a material to be treated over said member, and material elevating and supporting means comprising pivotally connected members for varying the extent of contact between the material and the heating member.

23. In a fabric heating machine, the combination with a heating member, of means for carrying the fabric over said member, and a plurality of pivoted lifter members carrying parts interposed between the fabric and the heating member for the purpose described.

24. In a fabric heating machine, the combination with a heating member, of means for drawing a fabric over said member, a plurality of spaced elements for positively lifting the fabric to vary its extent of contact with the member and for positively placing the same on the drum.

25. In a fabric heating machine, the combination with a heating member, of a plurality of spaced lifting devices for positively elevating the fabric from the member, and a second independently shiftable lifting device around which said fabric passes for the purpose described.

In testimony whereof I hereunto affix my signature in the presence of two witnesses.

JOHN F. WHITE.

Witnesses:
  WALTER W. HISZ,
  HELEN A. NYMAN.